United States Patent [19]
Kudo et al.

[11] Patent Number: 5,574,558
[45] Date of Patent: Nov. 12, 1996

[54] OPTICAL ENCODING APPARATUS FOR MEASURING DISPLACEMENT OF AN OBJECT USING DIFFRACTION GRATINGS AND TWICE-DIFFRACTED AND TWICE-TRANSMITTED LIGHT

[75] Inventors: Kouichi Kudo; Nobuyuki Baba; Hideo Maeda, all of Yokohama, Japan

[73] Assignee: Ricoh Company, Ltd., Tokyo, Japan

[21] Appl. No.: 444,873

[22] Filed: May 19, 1995

[30] Foreign Application Priority Data

May 19, 1994 [JP] Japan .................................. 6-131411
Mar. 3, 1995 [JP] Japan .................................. 7-070951

[51] Int. Cl.$^6$ .................................................. G01B 9/02
[52] U.S. Cl. ......................................... 356/356; 250/237 G
[58] Field of Search ....................... 356/356; 250/237 G, 250/231.14

[56] References Cited

U.S. PATENT DOCUMENTS 5,486,923  1/1996  Mitchell et al. ..................... 356/356

FOREIGN PATENT DOCUMENTS 0486050  5/1992  European Pat. Off. ............... 356/356
2239088  6/1991  United Kingdom .................. 356/356

Primary Examiner—Samuel A. Turner
Attorney, Agent, or Firm—Oblon, Spivak, McClelland, Maier & Neustadt, P.C.

[57] ABSTRACT

An optical encoding apparatus is provided which is not affected by fluctuation of wavelength of a light beam due to temperature change, without sacrificing resolution of measurement. The optical encoding apparatus includes a light source for emitting a light beam, a light beam condenser for condensing the light beam emitted by the light source, a first diffraction grating to which light beams condensed by the light beam condenser are directed, and a second diffraction grating to which light beams exiting from the first diffraction grating are directed. Additionally, a displacement information obtaining device is included for obtaining information regarding a displacement of one of the first and second diffraction gratings, the information being obtained according to a twice-diffracted beam and a twice-transmitted beam incident upon the second diffraction grating. The twice-diffracted beam is diffracted by the first diffraction grating, and the twice-transmitted beam is transmitted through the first diffraction grating.

7 Claims, 16 Drawing Sheets

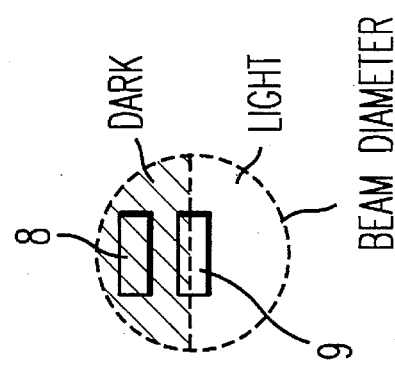
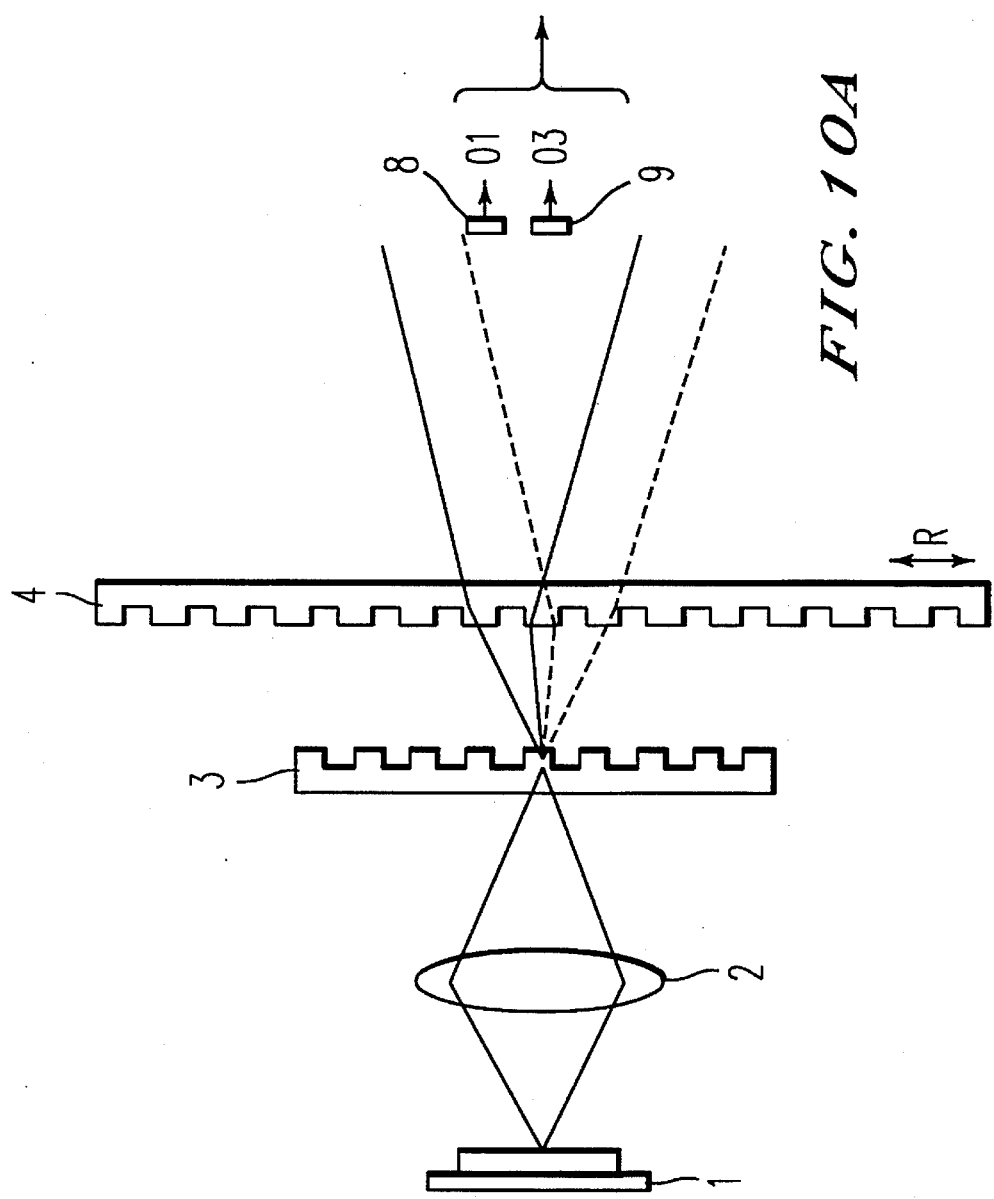

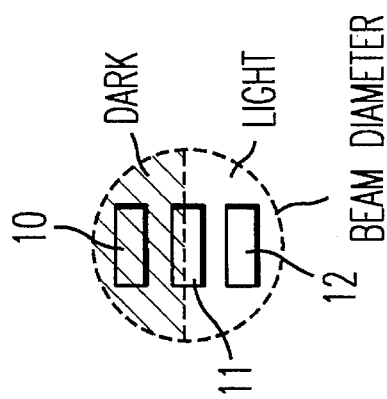
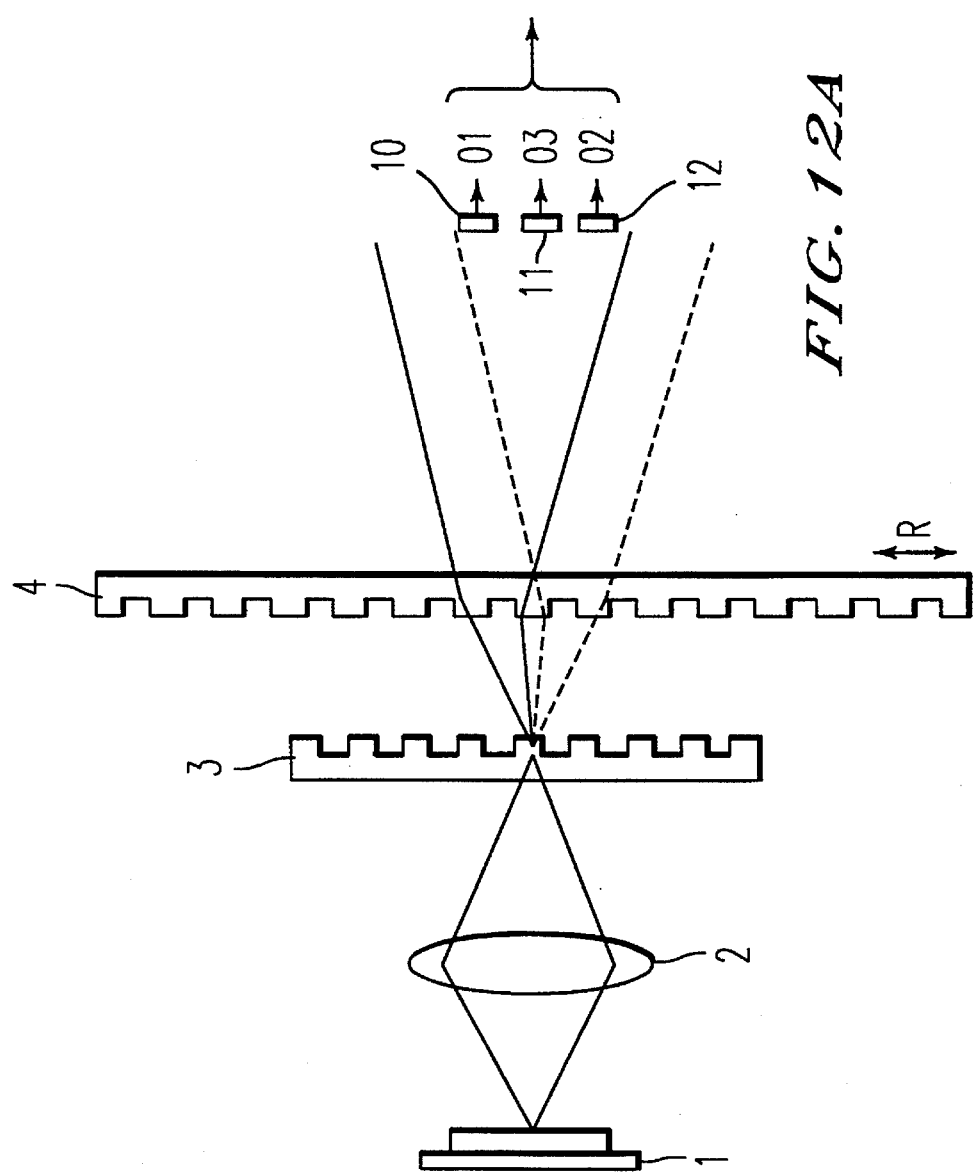

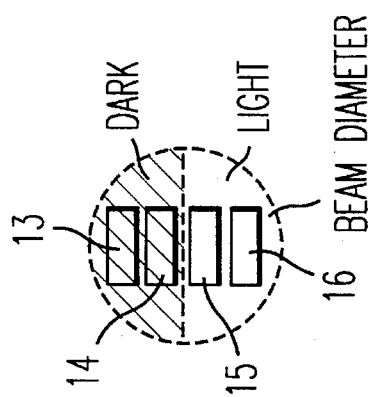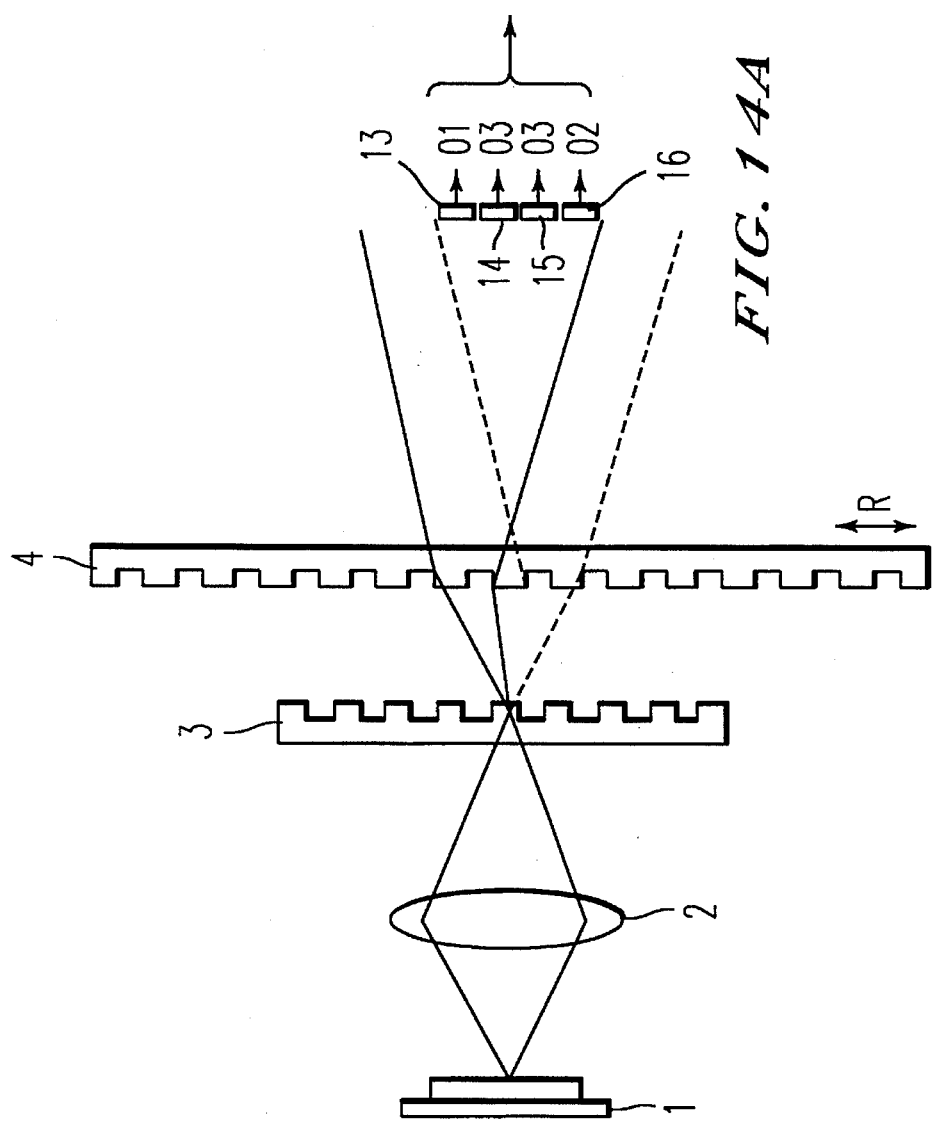

OPTICAL ENCODING APPARATUS FOR MEASURING DISPLACEMENT OF AN OBJECT USING DIFFRACTION GRATINGS AND TWICE-DIFFRACTED AND TWICE-TRANSMITTED LIGHT

BACKGROUND OF THE INVENTION

1. Field of the Invention

This invention relates to an optical encoding apparatus for making accurate measurements of displacement of an object with high resolution. Such an optical encoding apparatus is incorporated, for example, in a precision measuring apparatus, a drum rotation controlling device and a scanner for a copy machine, or the like.

2. Description of the Related Art

One of a conventional encoding apparatus is disclosed in German Laid-Open Patent Application (DE A1) NO. 2,316,248. FIG. 23 is an illustration showing a structure of encoding apparatus described in DE A1 2,316,248. The encoding apparatus comprises a light source 101, a lens 102 which collimates a light beam from the light source 101, two diffraction gratings 103 and 104 on which collimated light beam is incident, a condenser lens 105 and photo detectors 106, 107, 107'.

The diffraction grating 103 is fixed, and the diffraction grating 104 is movable. The pitch $\Lambda 1$ of the gratings 103 is same as the pitch $\Lambda 2$ of the grating 104. Hereinafter, the diffraction grating 103 is referred to as a fixed diffraction grating, and the diffraction grating 104 is referred to as a movable diffraction grating.

In the above-mentioned embodiment, a light beam emitted from light source 101 passes through the lens 102 and is collimated into parallel light rays. The collimated light beam is incident on the fixed diffraction grating 103 and then the movable diffraction grating 104. The collimated light beam generates at least a first diffraction beam when passing through the gratings 103 and 104. If the pitches of the gratings $\Lambda 1$ and $\Lambda 2$ are sufficiently larger than the wavelength of the collimated light beam, higher order diffraction light may be generated in each of the gratings.

FIG. 24 is an illustration explaining the diffraction light beams generated by the diffraction gratings 103 and 104. As shown in FIG. 23, a first order diffraction beam generated at the fixed diffraction grating 103 is transmitted through the movable diffraction grating 104, and received by the light receiving element 107 via the condenser lens 105. Additionally, the first order diffraction beam of the light beam transmitted through the fixed diffraction grating 103 without diffraction is generated by the movable diffraction grating 104, and is also received by the light receiving element 107 via the condenser lens 105.

As the movable diffraction grating 104 is moved in a direction indicated by an arrow R, the diffraction beams generated by the movable diffraction grating 104 are changed in their phase, while the phase of the original light beam transmitted through the fixed diffraction grating 103 and the movable diffraction grating 104 remains unchanged. That is, for example, the phase of the light beam A is not changed but the phase of the light beam B is changed. This results in phase shift of interference fringes generated by the light beams A and B on the light receiving element 107.

In this encoder, since the pitches $\Lambda 1$ and $\Lambda 2$ of two gratings 103 and 104 are equal to each other, diffraction angles of the diffraction beams having the same order at each of the gratings are the same. Accordingly, the light beams A and B are parallel to each other immediately after exiting the grating 104. If the light beams A and B are incident on the light receiving element 107 as in their parallel relationship, interference fringes generated on the light receiving element 107 have relatively large intervals. The interference fringes having such large intervals are not suitable to use for measuring the displacement of the movable diffraction grating 104 because a sufficient number of interference fringes are not formed on the light receiving element 107.

In order to form interference fringes having a suitable intervals, the condenser lens 105 is provided between the movable diffraction grating 104 and the light receiving element 107 so that the distance between the light beams A and B becomes narrow. According to this, as the movable diffraction grating 104 is displaced, the interference fringes are moved on the light receiving element 107, resulting in a sinusoidal change in the amount of light received by the light receiving element 107. Specifically, if the movable diffraction grating 104 moves a small distance corresponding to a single pitch of the grating, the level of output from the light receiving element 107 varies like a single period of sine wave. By sensing this change, the amount of the displacement of the movable diffraction grating 104 can be determined.

In the above-mentioned embodiment, although the description was given using the combination of one of the first diffraction beams generated on one side of the optical axis and the original light beam transmitted through the grating (hereinafter referred to as direct transmission beam), the combination of the other first diffraction beam may be used to form interference fringes on the light receiving element 107' as indicated by the light beams C and D in FIG. 24.

As for the light source 101 used for the above-mentioned optical encoding apparatus, a semiconductor laser (LD) is used because of requirements for compactness and high output of light. However, there is a problem in that the semiconductor laser has high dependency in its wavelength, that is, the wavelength varies due to temperature changes of the light source. Accordingly, due to the temperature change, the diffraction angle at the gratings 103 and 104 is changed, and thus the optical path in the encoding apparatus may be changed, which condition may result in that the suitable interference fringes to generate output of the light receiving element are not formed on the light receiving element. In an extreme case, the diffraction beam is directed beyond the edge of the lens 105. For example, as shown in FIG. 25, when the temperature changes, the light beams A and B may be diverted to paths indicated by the light beams A' and B', respectively. In order to avoid the effect of temperature change, the diffraction angle may be minimized by increasing the pitches A1 and A2. In such a case, however, resolution of the displacement information of the encoding apparatus may be decreased.

Another optical encoding apparatus is described in U.S. patent application Ser. No. 08/215,566, filed Apr. 18, 1994 by the present applicant. It discloses an optical encoding apparatus comprising two diffraction gratings having almost equal grating pitches, and generating interference fringes which are not influenced with a wavelength change of the light beam emitted by the light source. This disclosure is hereby incorporated by reference.

However, these types of diffraction gratings are usually difficult to manufacture because of the necessity of planning the gratings having almost equal pitches with a predetermined difference is very strict for accurate generation of interference fringes. For example, the difference in pitch which can be obtained with appropriate interference fringes for accurate measurements is within a range of 0.03% in the above-mentioned application.

SUMMARY OF THE INVENTION

Accordingly, one object of this invention is to present a novel and efficient optical encoding apparatus for detecting displacement of an object with high resolution.

A more specific object of the present invention is to provide an optical encoding apparatus to keep accurate detection of the displacement of an object, not affected by fluctuation of wavelength of a light beam due to temperature change of the light source, without sacrificing resolution of measurement.

Another object of this invention is to provide an optical encoding apparatus in which interference fringes having a predetermined interval can be formed accurately.

Another object of this invention is to provide an optical encoding apparatus having gratings which can be easily manufactured.

Another object of this invention is to provide an optical encoding apparatus having components which can be easily aligned each components of the optical encoding apparatus therein.

In order to achieve the above-mentioned objects, there is provided according to the present invention, an optical encoding apparatus having a light source for emitting a light beam, a light beam condensing means for condensing the light beam emitted by the light source, a first diffraction grating to which the light beam condensed by the light beam condensing means is directed, a second diffraction grating to which light beams exiting from the first diffraction grating are directed, and displacement information obtaining means for obtaining information on a displacement of one of the first and second gratings, the information being obtained according to a twice-diffracted beam and a twice-transmitted beam at the second grating, the twice-diffracted beam being generated from a diffraction beam generated at the first grating, the twice-transmitted beam being a transmission beam which has been transmitted through the first grating.

According to another aspect of the present invention, there is provided an optical encoding apparatus for obtaining information regarding a movable grating incorporated therein in accordance with a movement of interference fringes caused by a displacement of the movable grating, the optical encoding apparatus having a light source for emitting a light beam, a light beam condensing means for condensing the light beam emitted by the light source, a first diffraction grating to which the light beam condensed by the light beam condensing means is directed, a second diffraction grating to which light beam exiting from the first diffraction grating are directed, and a plurality of light receiving elements, spaced apart a distance corresponding to an interval between the interference fringes, the elements outputting signals having different phase from each other.

The light receiving elements may be spaced apart a distance corresponding to one quarter of the interval between the interference fringes.

BRIEF DESCRIPTION OF THE DRAWINGS

A more complete appreciation of this invention and many of the attendant advantages thereof will be readily obtained as the same becomes better understood by reference to the following detailed description when considered in connection with the accompanying drawings, wherein:

FIG. 10 is an illustration of an encoder in which two light receiving elements are provided spaced apart from each other a distance corresponding to one quarter of the interval between interference fringes;

FIG. 12 is an illustration of an encoder in which three light receiving elements are provided spaced apart from each other a distance corresponding to one quarter of the interval between interference fringes;

FIG. 14 is an illustration of an encoder in which four light receiving elements are provided spaced apart from each other a distance corresponding to one quarter of the interval between interference fringes;

DESCRIPTION OF THE PREFERRED EMBODIMENTS

The present invention may be implemented in various devices, such as a precision measuring apparatus, a drum rotation controlling device, and a scanner for a copy machine or the like. In the following description, specific details of an optical system are set forth in order to provide a thorough understanding of the present invention.

Figure 1:
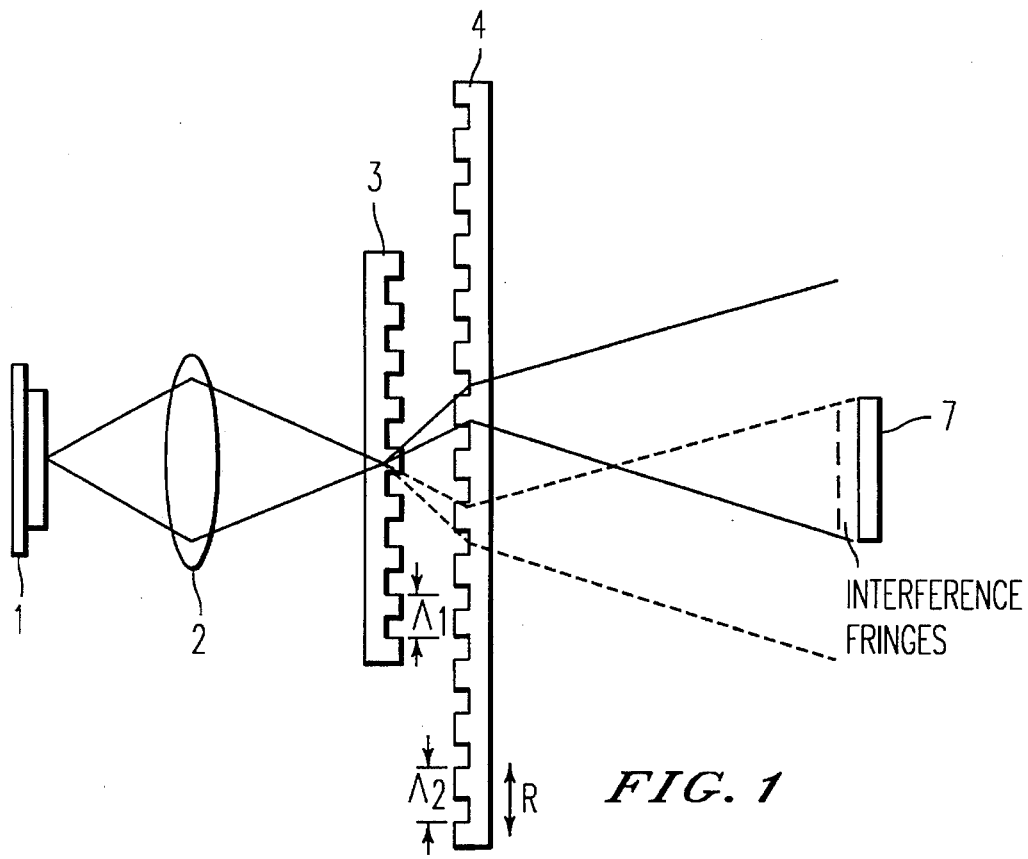
FIG. 1 is an illustration showing the first embodiment of an optical encoding apparatus according to the present invention.

Referring now to the drawings, wherein like reference numerals designate identical or corresponding parts throughout the several views, FIG. 1 illustrates a first embodiment of the present invention. The optical encoding apparatus shown in FIG. 1 comprises a light source 1, a condenser lens 2 which condenses a light beam emitted by the light source 1, two diffraction gratings 3 and 4, and a light receiving element 7.

A semiconductor laser diode (LD) or a light emitting diode (LED) can be used as the light source 1. Two diffraction gratings 3 and 4 are arranged such that the diffraction grating surfaces of the gratings 3 and 4 are parallel to and opposed to each other. The diffraction grating 3 having grating pitch $\Lambda 1$ is fixed, and the diffraction grating 4 having grating pitch $\Lambda 2$ is movable in a direction indicated by an arrow R. Hereinafter, the grating 3 is referred to as a fixed diffraction grating, and the grating 4 is referred to as a movable diffraction grating.

A description will now be given of a principle of operation of the present invention with reference of FIG. 2.

Figure 2:
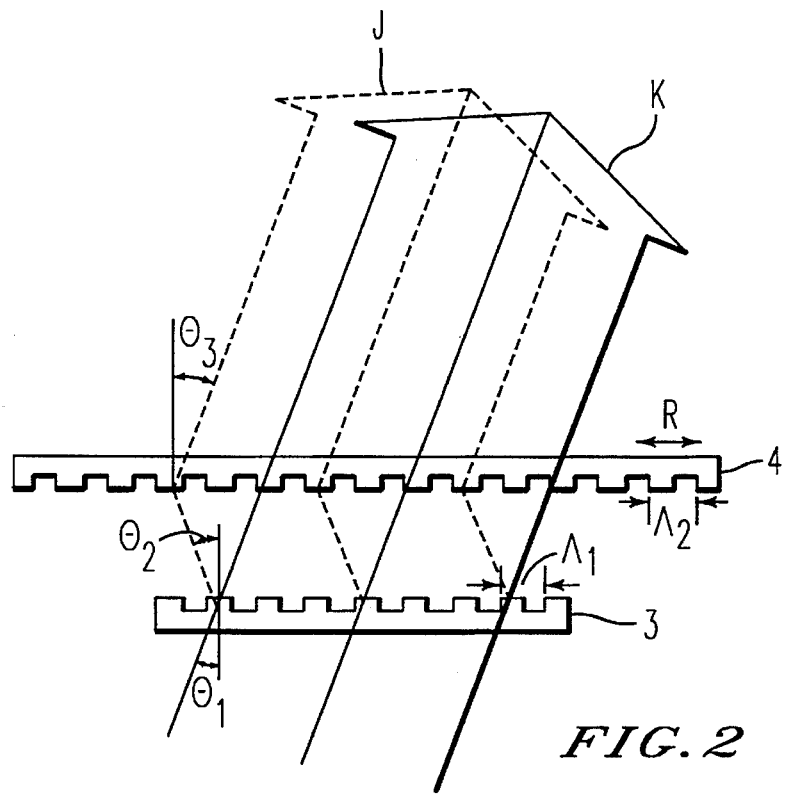
FIG. 2 is an illustration explaining a principle of the present invention.

In the first embodiment, as shown in FIG. 2, in order to generate interference fringes, a diffraction beam J (twice-diffracted beam) which is diffracted by both the fixed diffraction grating 3 and the movable diffraction grating 4 and a light beam K (twice-transmitted beam) which is transmitted directly through both the fixed diffraction grating 3 and the movable diffraction grating 4 are utilized. That is, displacement information of the movable diffraction grating 4 is obtained in accordance with the twice-diffracted beam J and the twice-transmitted beam K.

Conditions of diffraction at the fixed diffraction grating 3 and movable diffraction grating 4 are given by the following expressions.

$$\sin \Theta 1 + \sin \Theta 2 = n \, \lambda/\Lambda 1 \quad (1a)$$

$$\sin \Theta 1 + \sin \Theta 3 = n \, \lambda/\Lambda 2 \quad (1b)$$

where $\Theta 1$ is an incident angle at the fixed diffraction grating 3;

$\Theta 2$ is the diffraction angle at the fixed diffraction grating 3;

$\Lambda 1$ is the pitch of the fixed diffraction grating 3;

n is the order of diffraction at the fixed diffraction grating 3;

$\Theta 3$ is the diffraction angle at the movable diffraction grating 4;

$\Lambda 2$ is the pitch of the movable diffraction grating 4;

m is the order of diffraction at the movable diffraction grating 4;

$\lambda$ is the wavelength of the light source 1;

By eliminating $\Theta 2$ from the above expressions, the following expression is obtained.

$$\sin \Theta 1 - \sin \Theta 3 = \lambda(n/\Lambda 1 - m/\Lambda 2) \quad (2)$$

According to the expression (2), it is understood that when the wavelength $\lambda$ changes, the diffraction angle $\Theta$ is changed in proportion to $(n/\Lambda 1 - m/\Lambda 2)$. Therefore, in order to obtain a constant diffraction angle even if the wavelength $\lambda$ is changed, the orders of diffraction m and n and the pitches $\Lambda 1$ and $\Lambda 2$ must satisfy the following relationship.

$$(n/\Lambda 1 - m/\Lambda 2) = 0 \quad (3)$$

In the above relationship, if the pitch $\Lambda 1$ is equal to the pitch $\Lambda 2$, the order of diffraction at each of the gratings 3 and 4 should be the same number. That is, n should be equal to m. More specifically, a first diffraction beam of the movable diffraction grating 4 generated from first diffraction beam of the fixed diffraction grating 3 may be used, for example, as the light beam J as shown in FIG. 2.

As mentioned above, the diffraction angle $\Theta 3$ can be constant regardless of changes in the temperature. Additionally, because the diffraction angle $\Theta 3$ is then equal to the incident angle $\Theta 1$, the twice-diffracted beam J is always parallel to the twice-transmitted beam K as shown in FIG. 2. The beams J and K are very stable with respect to temperature, and this enables a decrease of the pitches $\Lambda 1$ and $\Lambda 2$ of the fixed diffraction grating and the movable diffraction grating 4, resulting in an increase in diffraction efficiency and higher resolution.

Figure 3:
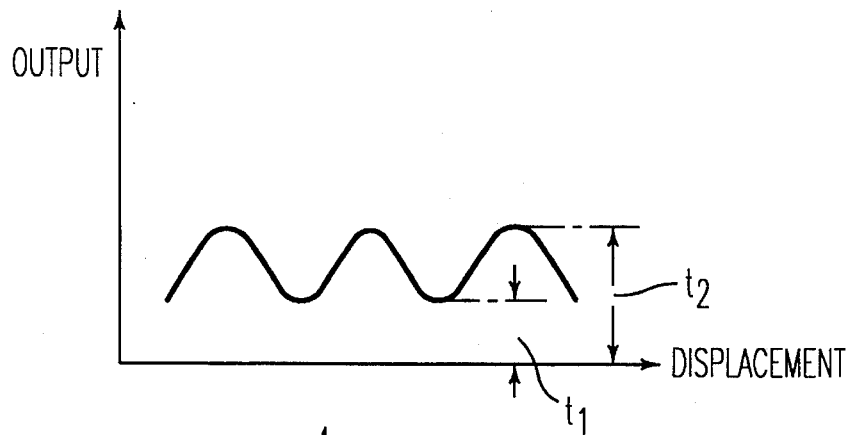
FIG. 3 is a graph showing output signals from the light receiving elements of FIG. 1.

If the light receiving element 7 has a light receiving surface smaller than the interval between interference fringes, the amount of light received by the light receiving element 7 changes as shown in FIG. 3. Therefore the displacement of the movable diffraction grating 4 can be sensed by the output from the light receiving element 7 in accordance with the change in amount of light received. Therefore, the interference fringes are moved according to a displacement of the movable diffraction grating 4, a sine waveform signal as shown in FIG. 3 can be obtained by the light receiving element 7, for receiving the diffracted light beams J and F. More specifically, when the movable diffraction grating would be moved a distance of the gratings, the interference fringes are moved a distance equal to the interval thereof. An output signal from the light receiving element 7 is varied one cycle of sine waveform and it would be possible to obtain a displacement of the movable diffraction grating 4 from the output signal as a relative displacement information between the fixed grating and the movable grating.

Generally, the movable diffraction grating 4 needs to be longer than the length of the fixed diffraction grating 3 since the movable diffraction grating 4 is moved.

In the present invention, the limitation concerning the grating pitches is relatively flexible. Generally, for obtaining interference fringes using two light beams, divergent characteristics between two light beams are utilized. And the divergent characteristics are closely related to the condensed characteristics of the light beams, and not much related to the diffraction angle based on the grating pitch.

In the present embodiment shown in FIG. 1, furthermore, the condenser lens 2 condenses the light beam emitted by the light source 1 onto the surface of the fixed grating 3, or the surface of the movable grating 4. In other words, the condenser lens 2 is a light condenser in this embodiment. According to this structure, it is possible to provide a condensed light beam having a sufficiently small spot. That is, a beam diameter incident on the fixed grating 3 and the movable grating 4 will be sufficiently small. The beam diameter of the condensed light beam is sufficiently smaller than that of collimated light, it is not sufficiently affected by a small difference in the grating pitch. In another words, the pitches of two gratings may be slightly different. This means that it is easy to manufacture the two types of gratings and easy to align the same. In the following explanation, however, the grating pitches $\Lambda1$ and $\Lambda2$ are equal to each other for convenience of explanation.

Figure 4:
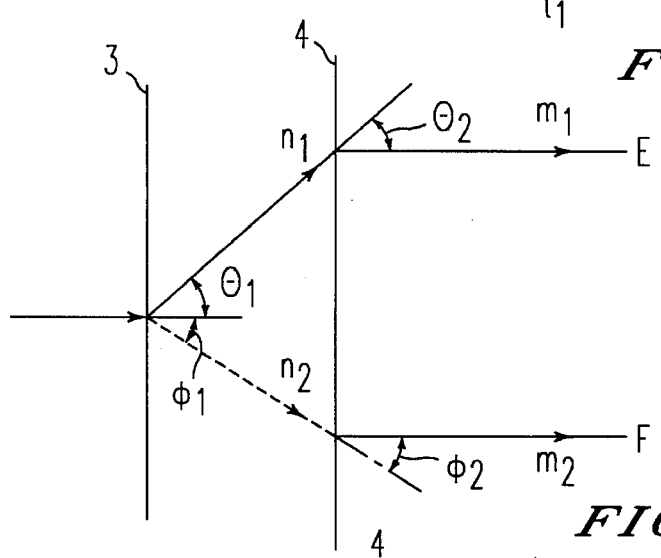
FIG. 4 is an illustration explaining a diffraction beam and a transmission beam at the two gratings shown in FIG. 1.

FIG. 4 is an illustration explaining an example in which the first diffraction beams of the fixed diffraction grating 3 and movable diffraction grating are used in order to generate interference fringes. In this embodiment, the grating pitches $\Lambda1$ and $\Lambda2$ are equal to each other, so diffraction gratings which are manufactured by the same manufacturing process may be used. An input light beam from the condenser lens 2 is inputted perpendicularly to the fixed diffraction grating 3, for the simple explanation of this embodiment. This is not intended to limit the present invention.

In FIG. 4, a light beam E is a diffracted light beam of n1-th order which is diffracted by the fixed diffraction grating 3 having a diffraction angle $\Theta1$, and further, it is a diffracted light beam of m1-th order which is diffracted by the movable diffraction grating 4 having a diffraction angle $\Theta2$. Similarly, a light beam F is a diffracted light beam of n1-th order which is diffracted by the fixed diffraction grating 3 having a diffraction angle $\Theta1$, and further, it is a diffracted light beam of m2-th order which is diffracted by the movable diffraction grating 4 having a diffraction angle $\Theta2$. The light beams E and F generate interference fringes due to light beam interference. In this embodiment, displacement information concerning the movable diffraction grating 4 can be obtained by an output signal of the light receiving element 7, such as a conventional photo detection device, incorporated as components of a typical linear encoder or rotary encoder, respectively.

In the following description, the diffraction order of the diffracted light beams E and F is defined by following expression for the sake of convenience of description;

$$n1=-n2$$

$$m1=-m2$$

$$n1=-m1$$

In the embodiment of FIG. 4, the diffracted light beam E meets the condition of the following expressions. Where $\theta1$ is the diffraction angle of the fixed diffraction grating 3; $\Lambda1$ is the pitch of the fixed diffraction grating; $\lambda$ is the wavelength of the condensed beam from the light source 1.

$$\sin \theta1 = n1\ \lambda/\Lambda1 \tag{4}$$

$$\sin \theta1 + \sin \theta2 = nl\ \lambda/\Lambda1 \tag{5}$$

It would be obtained the following expression for deleting sin $\theta1$ from the above mentioned expressions (1) and (2).

$$\sin \theta2 = ml\ \lambda/\Lambda1 - nl\ \lambda/\Lambda1 = 0 \tag{6}$$

$$2=0 \tag{7}$$

Similarly, the diffracted light beam F meets the condition of the following expressions. Where $\emptyset1$ is the diffraction angle of the fixed diffraction grating; $\Lambda2$ is the pitch of the fixed diffraction grating; $\lambda$ is the wavelength of the condensed beam from the light source 1.

$$\sin \emptyset1 = nl\ \lambda/\Lambda2 \tag{8}$$

$$\sin \emptyset1 + \sin \emptyset2 = ml\ \lambda/\Lambda2 \tag{9}$$

It would be obtained the following expression for deleting sin $\emptyset1$ from the above mentioned expression.

$$\sin \emptyset2 = ml\ \lambda/\Lambda2 - nl\ \lambda/\Lambda2 = 0 \tag{10}$$

$$\emptyset2=0 \tag{11}$$

According to the above-mentioned expressions (7) and (11), the diffraction light beam is emitted in the same direction, namely, perpendicularly from the surface of the gratings 3 and 4. In this condition, the diffraction light beams E and F will generate interference fringes on the light receiving element 7 because the condensed light beams E and F will have divergent characteristics after being condensed by the condenser lens 2 and transmitted through the gratings 3 and 4. Then the diffraction light beams E and F are incident on the light receiving element 7 as divergent light beams having curved wave surfaces.

The interference fringes will be moved in accordance with the movement of the movable diffraction grating. Therefore, the displacement information would be obtained by an output signal from the light receiving element 7, as a sine waveform signal similar to the above explanation concerning FIG. 3.

The interference fringes could be obtained under the condition that the number of grating pitches $\Lambda2$ is a number of times larger than the number of grating pitches $\Lambda1$. Furthermore, the interference fringes could be obtained by receiving the diffracted light beams E and F overlapping each other, therefore, any diffraction order light beam could be used. Although, among the order of diffraction beams, the first diffraction beam provides a preferable result.

An experimental example of parameters of the present embodiment will now be described, for generating interference fringes has no dependency on wavelength change, and for accurate detecting of displacement information. In the case of the encoding apparatus shown in FIG. 1, when nl=1, n2=-1, ml=2, m2=-2, and $\Lambda1=2$ μm and $\Lambda2=4$ μm, the focus distance of the condenser lens (f)=3.9, and the length between a focusing point of condenser lens and the condenser lens (L)=4.25 mm, it is possible to obtain interference fringes having an interval $\Lambda$; $(\Lambda)=1.09$ mm.

In the embodiment shown in FIG. 1, it is possible to adjust intervals of interference fringes at the position of the light receiving element 7 for controlling the focus distance of the condenser lens 2, or for controlling a numerical aperture (NA) of the condenser lens 2, or for controlling a length between a focusing point of condenser lens 2 and the grating surfaces. Thus, this embodiment provides an appropriate structure for producing interference fringes having suitable intervals for accurate detecting of the displacement of an object.

Figure 5:
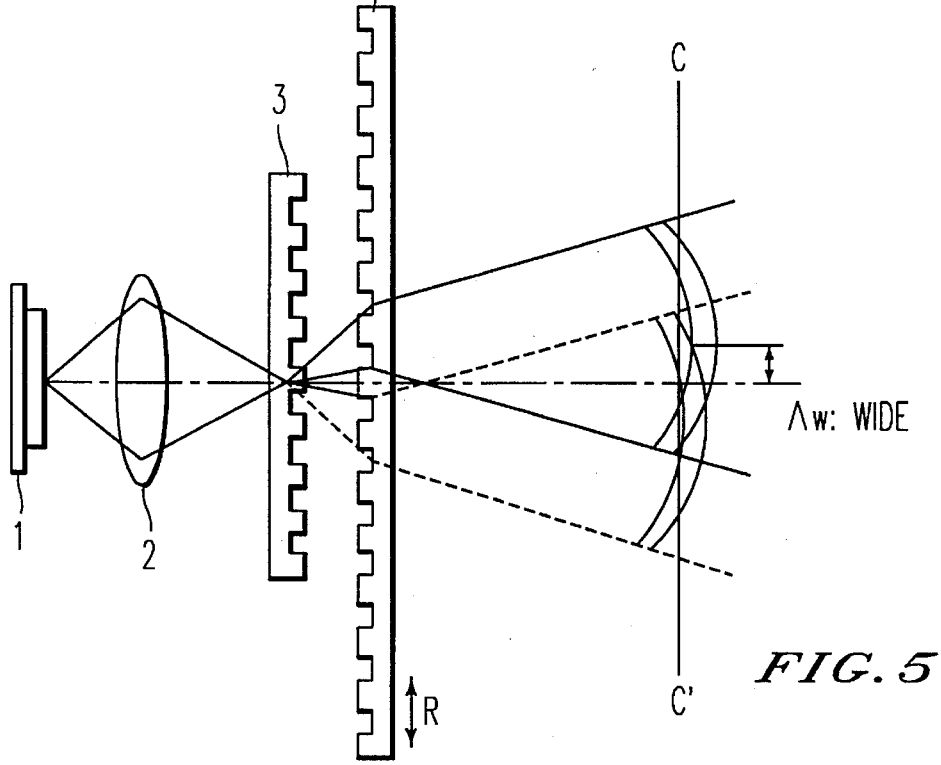
FIG. 5 is an illustration explaining a transmission beam at the two gratings and a generation of interference fringes having a wide interval at the observation plane shown in FIG. 1.
Figure 6:
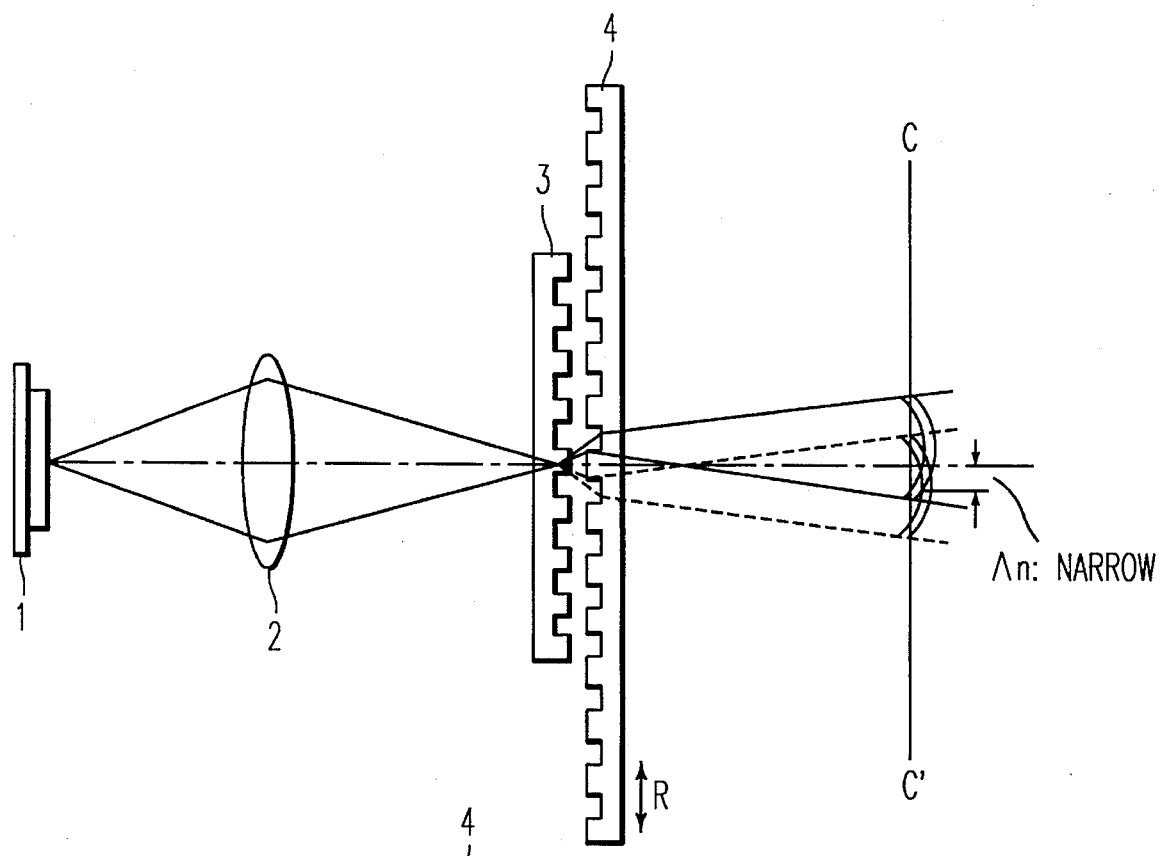
FIG. 6 is an illustration explaining a transmission beam at the two gratings and a generation of interference fringes having a narrow interval at the observation plane shown in FIG. 1.

For example, FIGS. 5 and 6 show examples of the generation of interference fringes due to controlling a length between a focusing point of condenser lens 2 and grating surfaces. FIG. 5 illustrates the generation of interference fringes having an interval $\Lambda w$, having a relatively large width, at the position of the line from C to C' described in FIG. 5. Meanwhile, FIG. 6 illustrates the generation of interference fringes having an interval An, having a relatively narrow width, at the position of the line from C to C' described in FIG. 6. According to this embodiment, it is possible to control the intervals of the interference fringes for obtaining the displacement information accurately.

Figure 7:
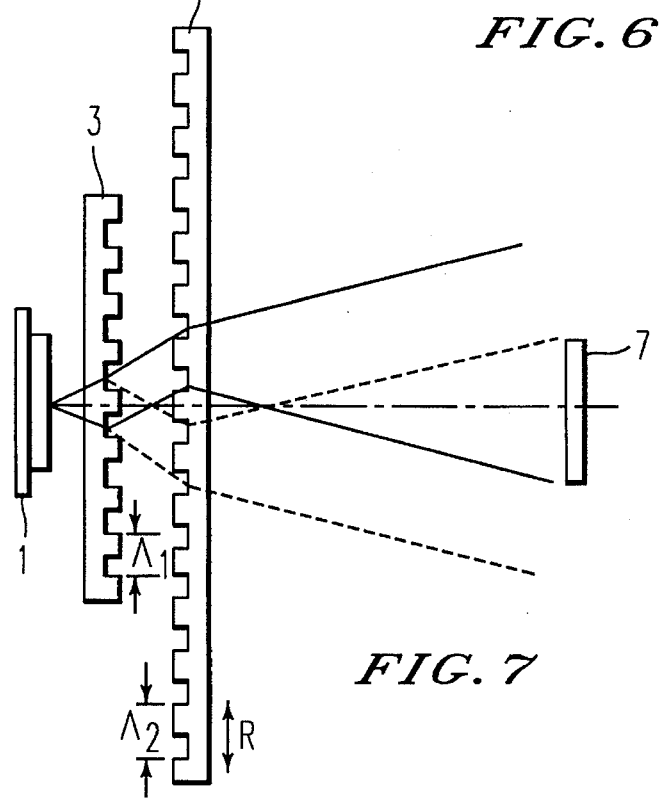
FIG. 7 is an illustration showing a modification of the first embodiment of an optical encoding apparatus shown in FIG. 1.

FIG. 7 illustrates a modification of the first embodiment of the optical encoding apparatus. Generally, the light source 1, such like a LD can be considered as a light source which emits divergent light beams from one spot. According to the construction of the encoding apparatus shown in FIG. 7, the light source 1 is provided near the fixed diffraction grating 3, so that the light source 1 emits divergent light beams sufficiently condensed at a surface of the fixed diffraction grating 3. In this embodiment, the beam diameter which is incident on the surface of the gratings would be considered sufficiently condensed, similar to when using the condenser lens 2 therein. Therefore, according to this embodiment, the condenser lens 2 for condensing the light beam emitted by the light source 1 can be eliminated.

Figure 8:
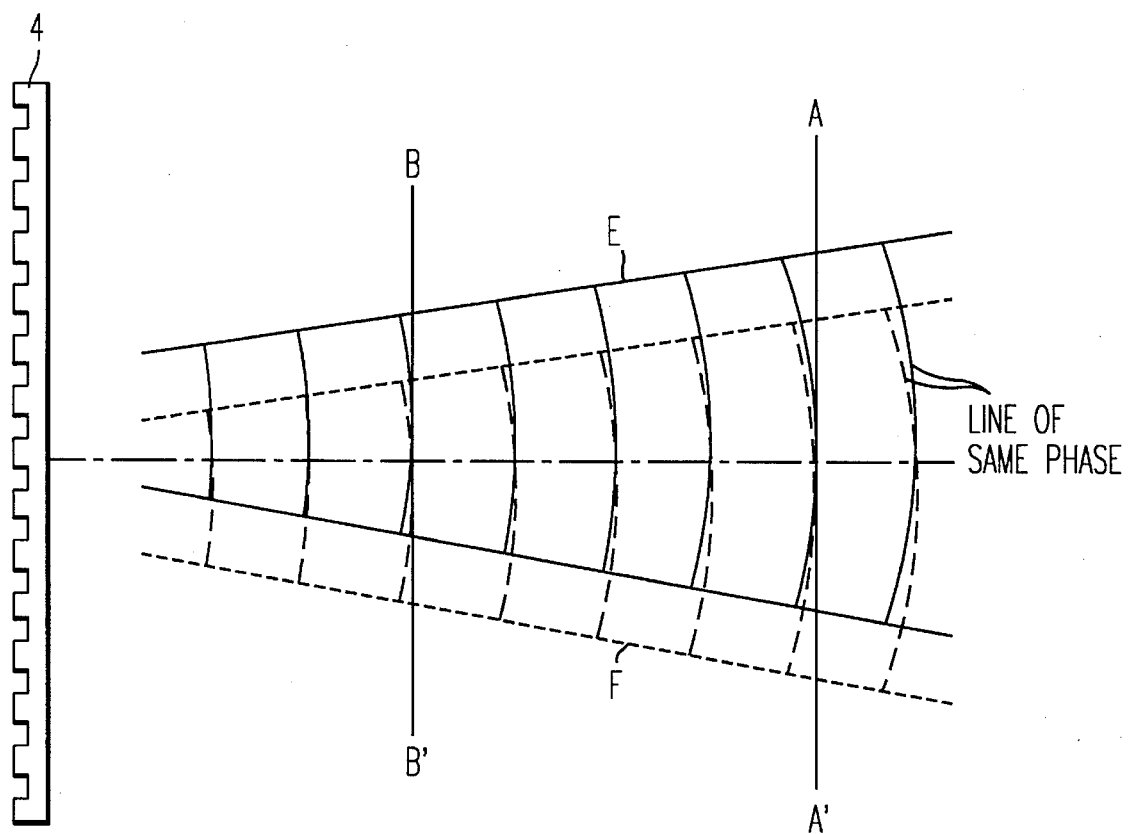
FIG. 8 is an illustration explaining a wave surface of the diffracted light beams E and F.
Figure 9A:
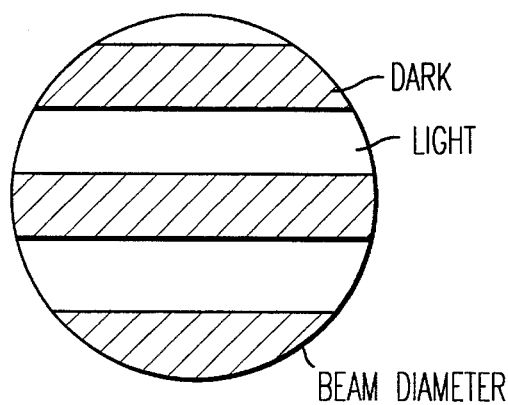
FIG. 9A is an illustration explaining generated interference fringes having wide intervals in the diffracted beam diameter.
Figure 9B:
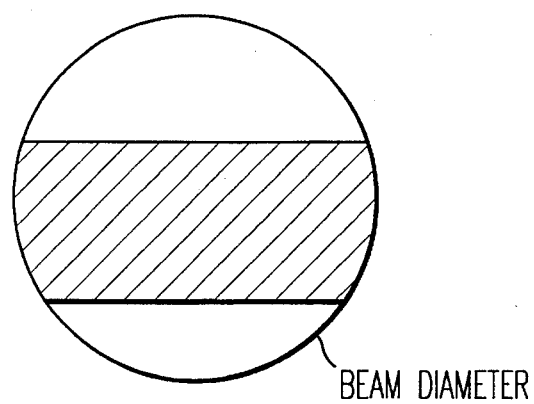
FIG. 9B is an illustration explaining generated interference fringes having narrow intervals in the diffracted beam diameter.

Furthermore, in the above-mentioned embodiments, the diffracted light beams E and F transmitted through the diffraction gratings have divergent characteristics as shown in FIG. 8. Therefore, the intervals between the interference fringes are different from each other when observed along the line from A to A' or along the line from B to B' illustrated in FIG. 8. In this embodiment, for controlling the observation line, it is possible to adjust intervals between interference fringes at the position of the light receiving element 7. That is, when the interference fringes will detected by the light receiving element 7 along the line from B to B' in FIG. 8, the intervals between the interference fringes will be narrow in the received beam diameter as shown in FIG. 9A. In case the interference fringes will be detected by receiving element 7 along the line from A to A' in FIG. 8, the intervals between the interference fringes will be wide in the received beam diameter as shown in FIG. 9B. According to the above-mentioned embodiments illustrated in FIG. 1 or FIG. 7, it is easy to control the intervals between the interference fringes for accurate detecting of the displacement information of an object with high resolution.

A description will now be given, with reference to FIG. 10 through FIG. 14, of displacement information obtaining means according to the present invention. In the above-mentioned embodiments and variations, the light receiving element outputs a sine waveform signal when the movable diffraction grating is moved. It is preferred that the sine waveform signal has a high aspect ratio (ratio of a peak level to a bottom level described in FIG. 3: t2/t1) for accurate detection of displacement information.

FIG. 10 shows a modification of the light receiving element of the optical encoding apparatus shown in FIG. 1 for outputting a sine wave signal. In this embodiment, two light receiving elements 8 and 9 are provided to receive the diffracted light forming interference fringes. The light receiving elements 8 and 9 are formed and arranged so that when a dark area and a bright area of the interference fringes are formed within the diameter of the light received by the light receiving elements, one of the light receiving elements 8 and 9 receives the dark area, while the other one receives the bright area. That is, the light receiving elements 8 and 9 are spaced apart from each other by a distance corresponding to one quarter of the pitch of the interference fringes. A sine waveform signal can be obtained from the difference between the outputs from light receiving elements 8 and 9.

Figure 11:
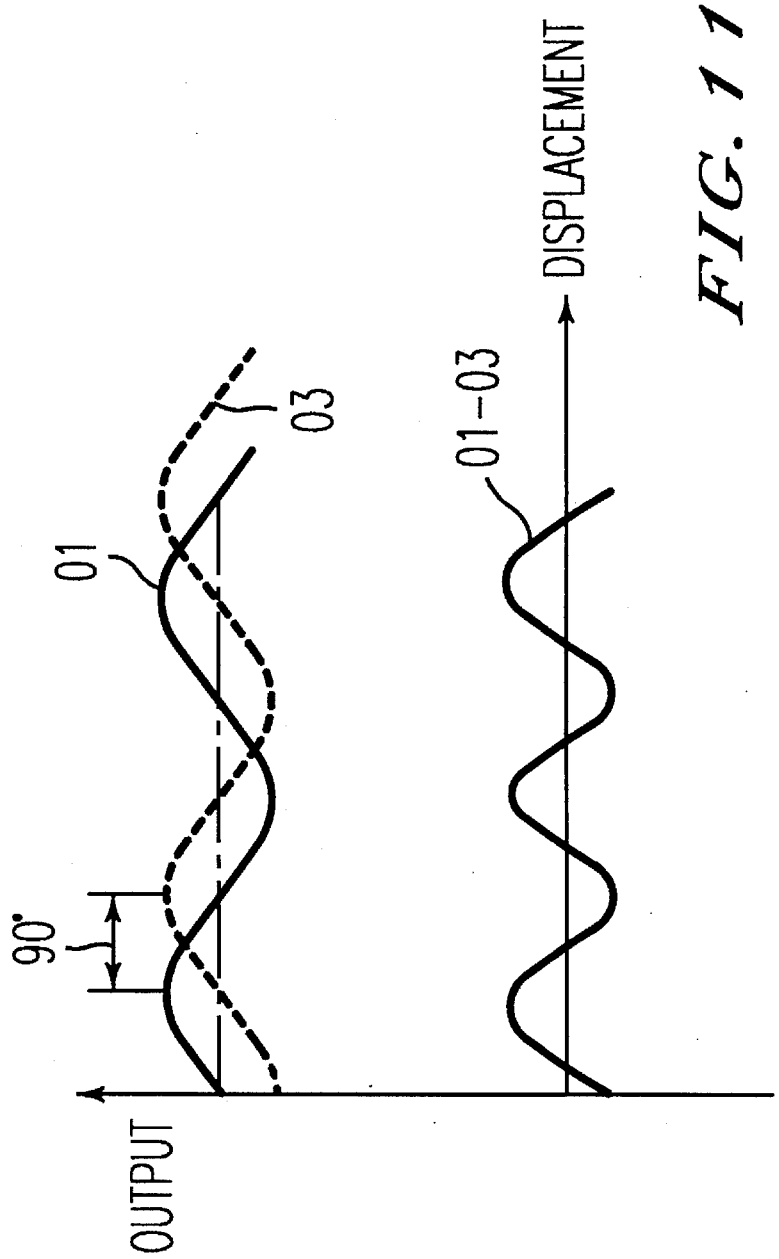
FIG. 11 is a graph showing output signals from the light receiving elements shown in FIG. 9.

FIG. 11 shows a relationship among the outputs 01 and 03 from the light receiving elements 8 and 9 and the sine waveform signal (01-03) obtained according to the difference between the outputs 01 and 03. As is seen in FIG. 11, the outputs 01 and 03 have phases shifted by 90° from each other. These outputs 01 and 03 correspond to the A-phase signal and B-phase signal used in a typical optical encoding apparatus, respectively. Accordingly, by taking a difference between the outputs 01 and 03, a bias component of the outputs can be eliminated, and thus a complete sine waveform signal (01-03) having a high aspect ratio is obtained. Additionally, in this case, as generally performed in conventional encoders, the output 01 (A-phase signal) and the output 03 (B-phase signal) can be used for determining a moving direction of the movable diffraction grating.

Figure 13:
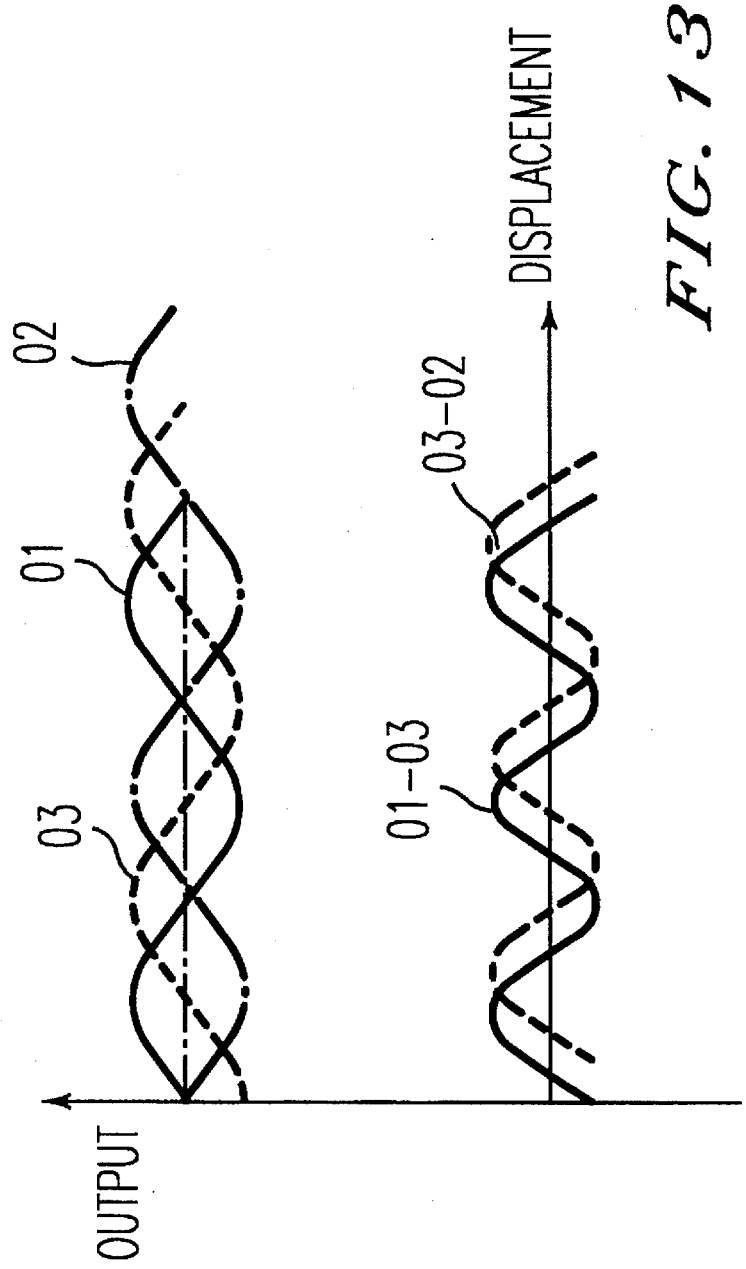
FIG. 13 is a graph showing output signals from the light receiving elements shown in FIG. 11.

In order to obtain a further improved signal having a high aspect ratio, three light receiving elements 10, 11, and 12 may be provided, as shown in FIG. 12, so that the three elements are spaced apart from each other by a distance corresponding to one quarter of the interval between the interference fringes. FIG. 13 shows the relationship between the outputs 01, 02, and 03 from the light receiving elements 10, 11, and 12 and the sine waveform signals (01-03) and (03-02) obtained according to the difference between the outputs 01 and 03 and the difference between the outputs 03 and 02. As is seen in FIG. 13, the outputs 01, 02, and 03 have phases shifted by 90' from each other. The sine waveform signals (01-03) and (03-02) correspond to the A-phase signal and B-phase signal used in a typical encoder, respectively. Accordingly, complete sine waveform signals (01-03) and (03-02) having a high aspect ratio are obtained, which signals are used for determining a moving direction of the movable diffraction grating.

In order to obtain a further improved signal having a high aspect ratio, four light receiving elements 13, 14, 15, and 16 may be provided, as shown in FIG. 14, so that the four elements are spaced apart from each other by a distance corresponding to one quarter of the interval between the interference fringes. In this embodiment, similar to the above-mentioned embodiment, the sine waveform signals (01-03) and (03-02) shown in FIG. 14 which correspond to the A-phase signal and B-phase signal would be obtained and used in a typical encoder, respectively.

When the interference fringes are generated using the diffraction gratings, there may be some interval change between a central portion of the beam diameter and a portion near the edge of beam diameter due to unevenness of the grating pitch. Therefore, in a case of using a plurality of light receiving elements, it is preferable that the light receiving elements be aligned in accordance with an interval change of the interference fringes for obtaining the output signals having phases shifted by 90° from each other.

Figure 15:
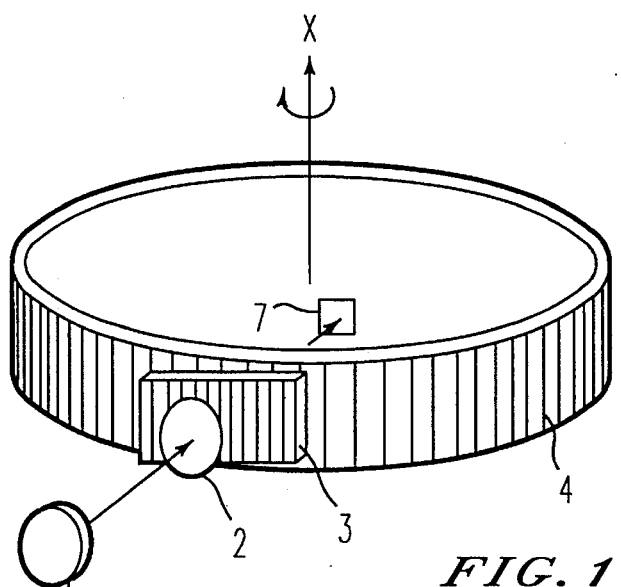
FIG. 15 is an illustration of a rotary encoder according to the present invention.
Figure 16:
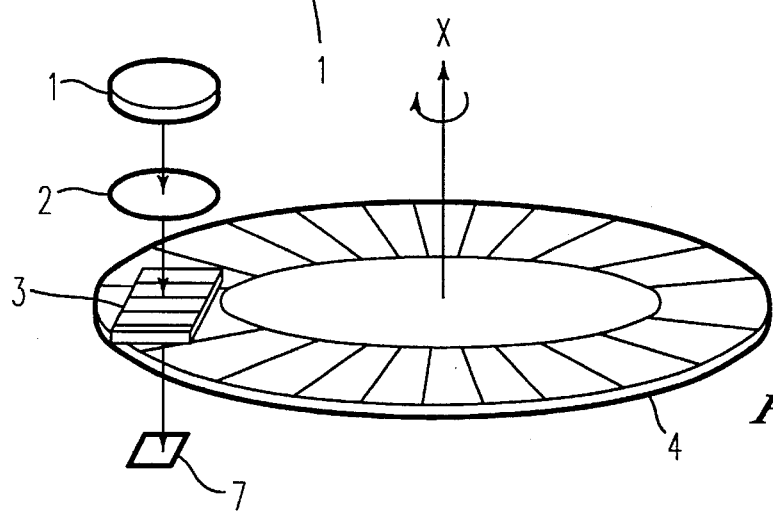
FIG. 16 is an illustration of a rotary encoder according to the present invention.

FIGS. 15 and 16 show examples of a rotary encoder using the principle of the present invention. The rotary encoder of FIG. 15 comprises the light source 1, the condenser lens 2 which condense the light beam emitted by the light source 1, the fixed diffraction grating 3, the movable diffraction grating 4 which is formed on a cylindrical surface, and the light receiving element 7. The movable diffraction grating 4 rotate about the axis X.

The rotary encoder of FIG. 16 comprises the light source 1, the condenser lens 2 which condense the light beam emitted by the light source 1, the fixed diffraction grating 3, the movable diffraction grating 4 which is formed on a flat circular surface, and the light receiving element 7. The movable diffraction grating 4 is rotate about the axis X. That is, displacement (movement) information of the movable diffraction grating 4 obtained by the light receiving element 7, including amount of rotation and rotation speed, of the movable diffraction grating can be obtained with high accuracy. Further, all the structures described with respect to the linear encoder of FIGS. 1 through 14 may be applied to the rotary encoders of FIGS. 15 and 16 with the same advantages mentioned previously.

Figure 17:
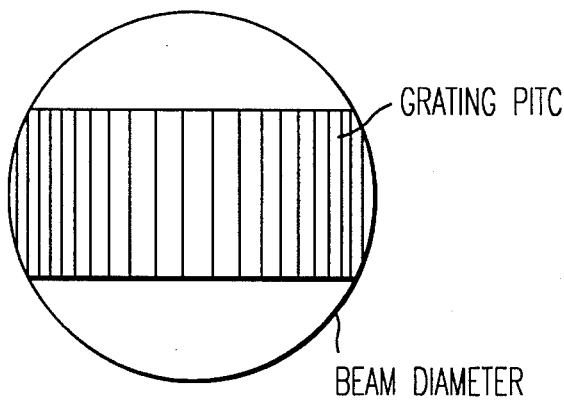
FIG. 17 is an illustration explaining the unevenness of pitches of a conventional rotary encoder.
Figure 18:
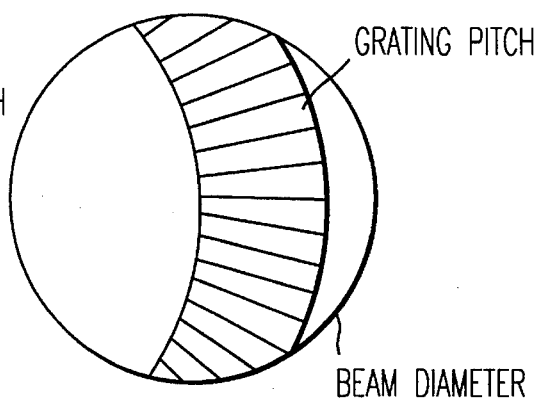
FIG. 18 is an illustration for explaining the unevenness of pitches of a conventional rotary encoder.

Generally, the pitch of the diffraction grating of the rotary encoder has unevenness of pitch of the grating when considered within a predetermined area, that is, a beam diameter formed by collimated light beam, as shown in FIGS. 17 and 18. FIG. 17 illustrates grating pitch formed on a cylindrical surface when collimated light beam is incident on the grating surface. Similarly, FIG. 18 illustrates grating pitch formed on a flat circular surface when collimated light beam is incident on the grating surface. As shown in FIGS. 17 or 18, the grating pitches have unevenness due to circularity of the movable grating. Noise is generated in the interference fringes at the position of the light receiving element, and this reduces the measurement accuracy of the displacement information obtained by the rotary encoder.

In the rotary encoder shown in FIGS. 15 and 16, however, a light beam emitted by the light source is provided to a sufficiently microscopic area on the surface of the diffraction gratings due to a function of the condenser lens which condenses the light beam emitted by the light source 1. According to this embodiment, the diffracted light beam is not affected by unevenness of pitches on the gratings. Therefore, noise can be reduced in the interference fringes and a high resolution of displacement information can be obtained.

According to the embodiment described in FIGS. 1, 7, 15, and 16, the light beam diameter which incident on the surface of the fixed diffraction grating 3 or the movable diffraction grating 4 become sufficiently microscopic due to the condenser lens 2. However, in case the area of the gratings upon which the light beam is incident contains noise, such as microscopic dust on the surface of the gratings, a signal-to-noise ratio of the displacement information obtained by the light receiving element 7 will be reduced and accuracy of measurement of displacement reduced.

The light beam which is condensed by the condenser lens 2 will generate interference fringes within a beam diameter of a circular shape. Generally, however, a light receiving surface of conventional light receiving element is formed of a rectangular shape. Thus, it is difficult to detect the displacement information with high efficiency according to the difference of the shape of the light receiving surface and the beam diameter.

Figure 19:
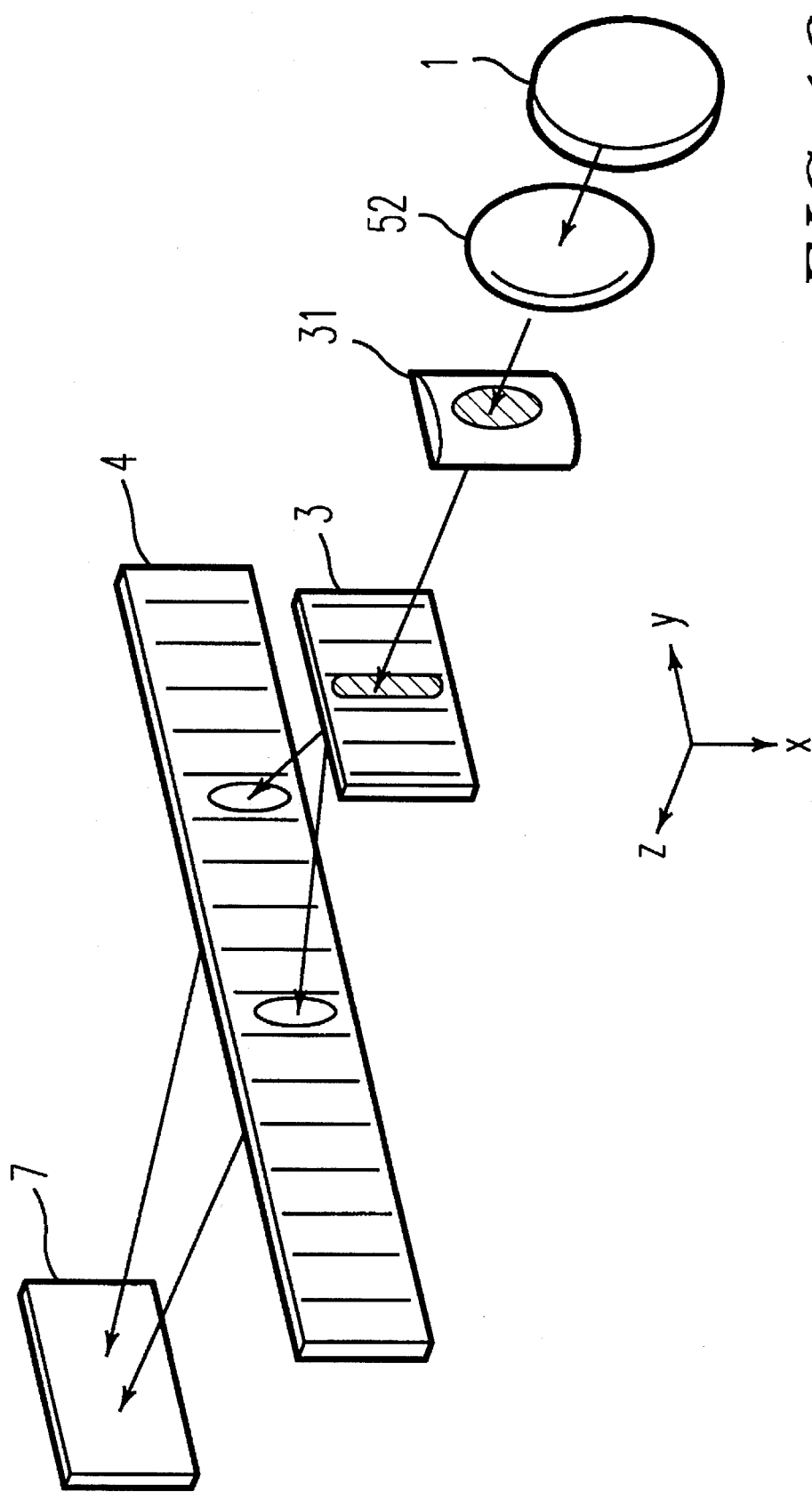
FIG. 19 is an illustration of a second embodiment of an optical encoding apparatus.

FIG. 19 shows another embodiment of an optical encoding apparatus of the present invention for overcoming the above-mentioned disadvantage. In this embodiment, in place of the condenser lens 2, a collimator lens 52 and a cylindrical lens 31 are provided. The collimator lens 52 is provided for producing a collimated light beam so as to have a parallel characteristic. The cylindrical lens 31 is provided for presenting a partial condensing function in this embodiment. That is, the cylindrical lens 31 condense the light beam onto the surface of the gratings, only in a direction of the axis Y, not in a direction of the axis X.

According to this embodiment, the light beam incident on the grating surface will generate interference fringes within a beam diameter of rectangular shape because of the collimator lens 52 and the cylindrical lens 31 which collimated and partially condensed the light beam. Accordingly, the light beam incident on the grating surface will have divergent characteristics in a direction of the axis Y, and have parallel characteristic in a direction of the axis X. This embodiment is effective for detecting the displacement information by the light receiving element 7 having a rectangularly-shaped light receiving surface.

Figure 20:
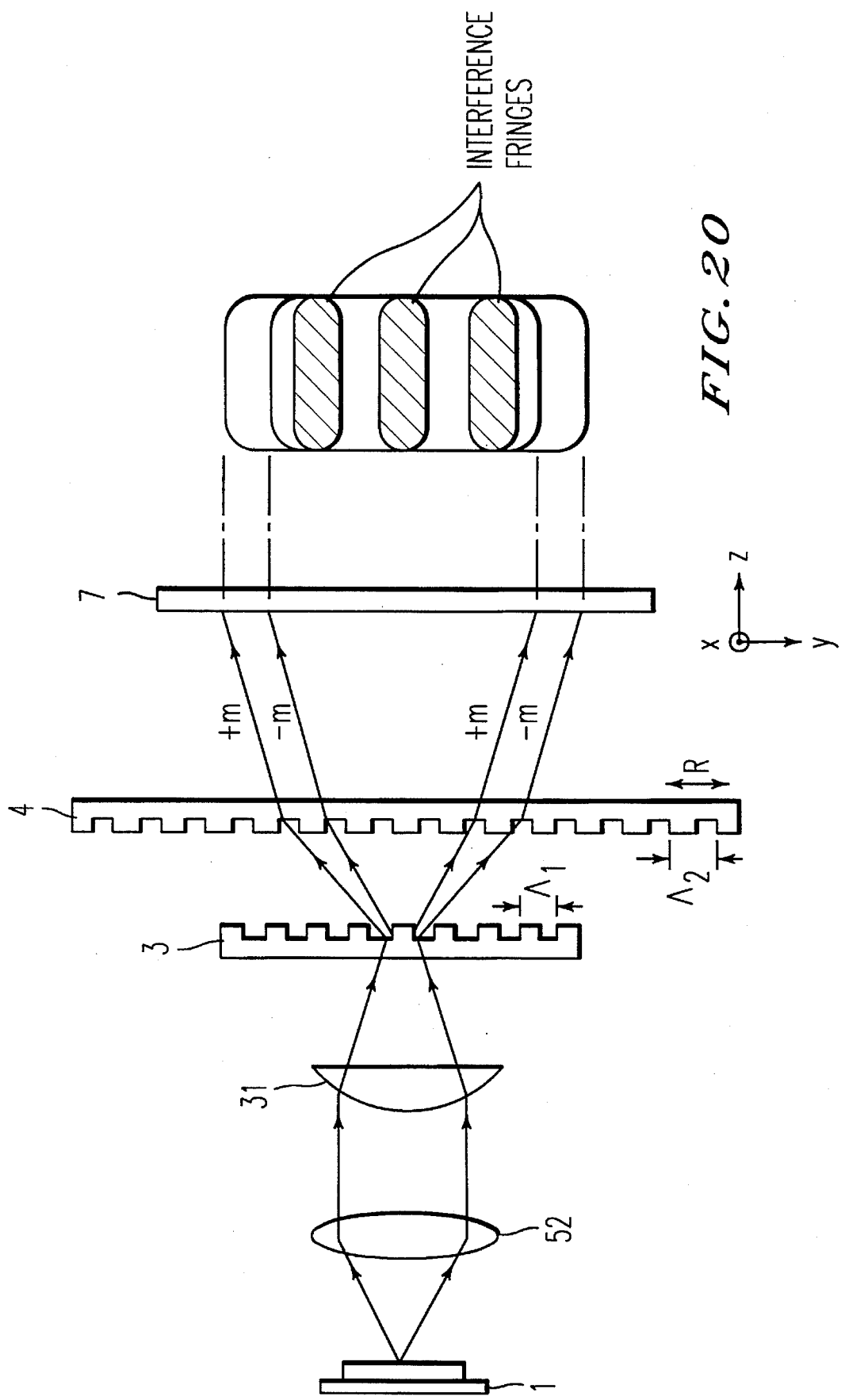
FIG. 20 is an illustration explaining another embodiment of an optical encoding apparatus as shown in FIG. 19.

FIG. 20 is an illustration explaining the embodiment as shown in FIG. 19. The collimator lens 52 collimates the light beam emitted from the light source 1 and gives the light beam parallel characteristics. Then, the cylindrical lens 31 condense the light beam only in a direction of the axis Y, and not in a direction of the axis X, as shown in FIG. 20. Therefore, the light beam which is incident on the grating surfaces is obtained as the light beam is sufficiently condensed and divergent in the direction of the axis Y, having a small width, and sufficiently collimated and having parallel characteristics in the direction of the axis X, having relatively large width.

For example, the fixed diffraction grating 3 generates diffraction beams whose diffraction orders are n-th and −n-th when the light beam from the cylindrical lens 31 is transmitted through the fixed diffraction grating. Then, when the diffraction beams are transmitted through the movable diffraction grating 4, the diffraction beams have diffraction orders of m-th and −m-th. In the direction of the axis X, the light beams whose orders are m-th and −m-th, are given parallel characteristics by the collimator lens 52 so that interference fringes would not be generated along the axis X. However, in the direction of the axis Y, the light beams whose orders are +m-th and −m-th, are given divergent characteristic by the cylindrical lens 31, and overlap each other along the axis Y. Therefore, interference fringes are generated along the axis Y within the beam diameter of rectangular shape as shown in FIG. 20. The interference fringes are moved in accordance with the movement of the movable diffraction grating. Accordingly, the displacement information is obtained by an output signal from the light receiving element 7, as a sine waveform signal similar to the above explanation concerning FIG. 3.

The interference fringes could be obtained by receiving the diffracted light beams overlapping each other. Therefore, a diffraction grating having any order of diffraction or any length of grating pitch could be used with appropriate alignment for generating interference fringes.

In this embodiment, the beam diameter incident on the grating surface is not condensed in a direction of the axis X. A large beam diameter could be generated using only condenser lens 2 as shown in FIG. 1. With this enlargement of the beam diameter, it is hard to affect the grating surface with noise, and detecting displacement information is possible. It is possible with this embodiment, not only to improve the accuracy of detection, namely signal-to-noise ratio, but also the efficiency of detection of displacement information.

Figure 21:
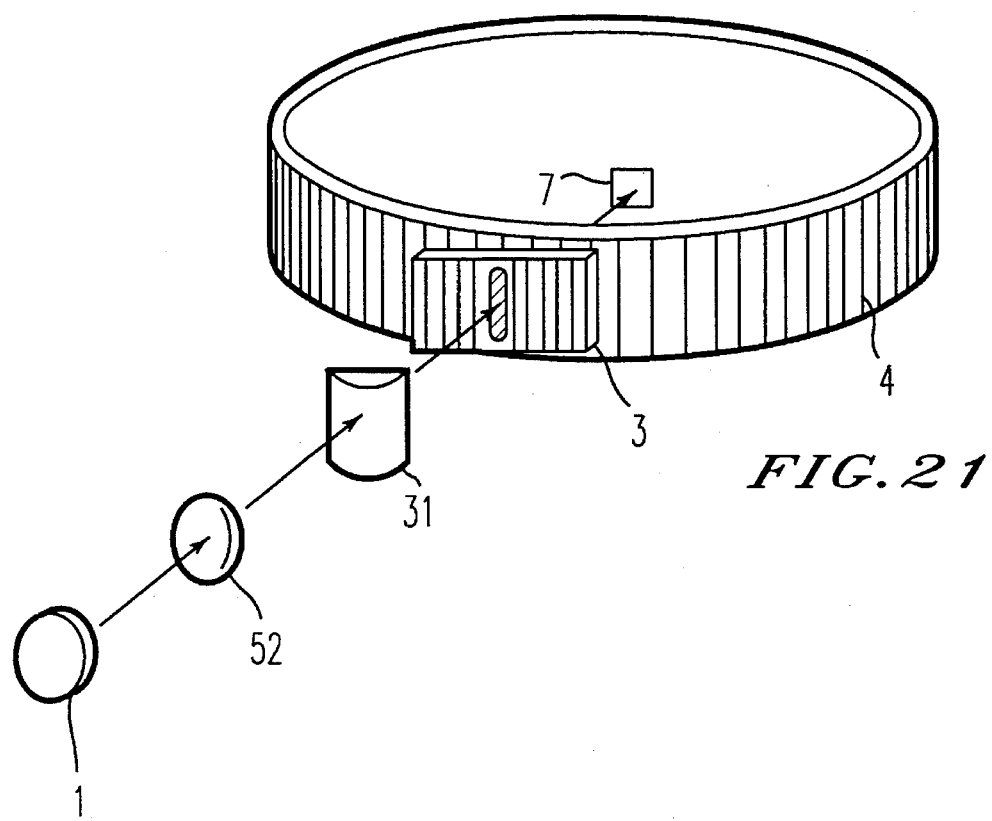
FIG. 21 is an illustration of a rotary encoder according to the embodiment shown in FIG. 19.
Figure 22:
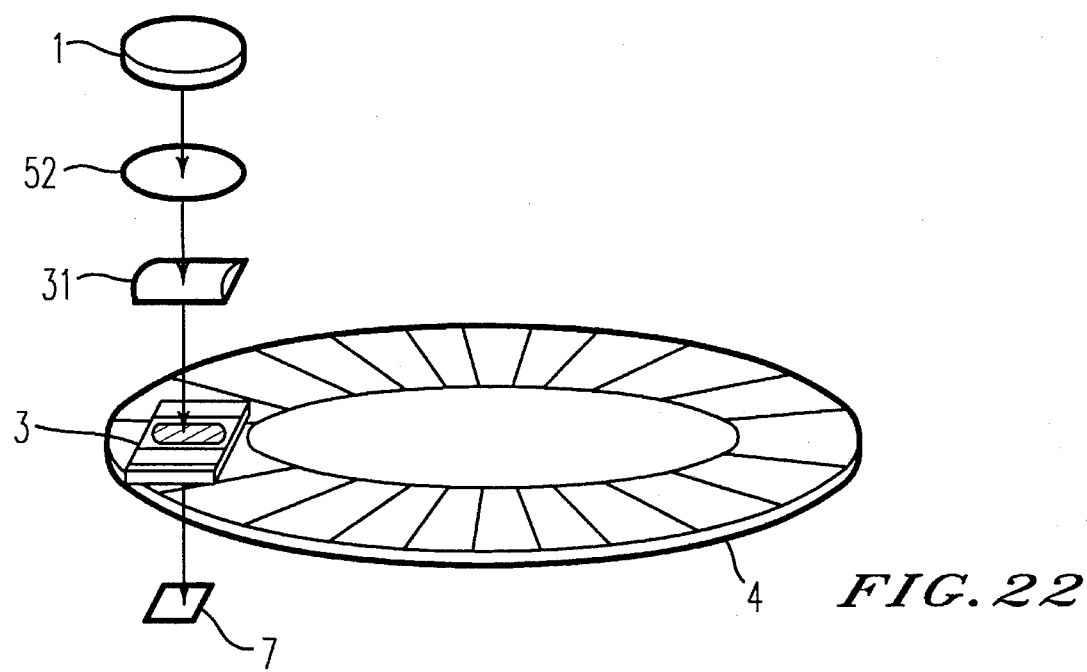
FIG. 22 is an illustration of a rotary encoder according to the embodiment shown in FIG. 19.
Figure 23:
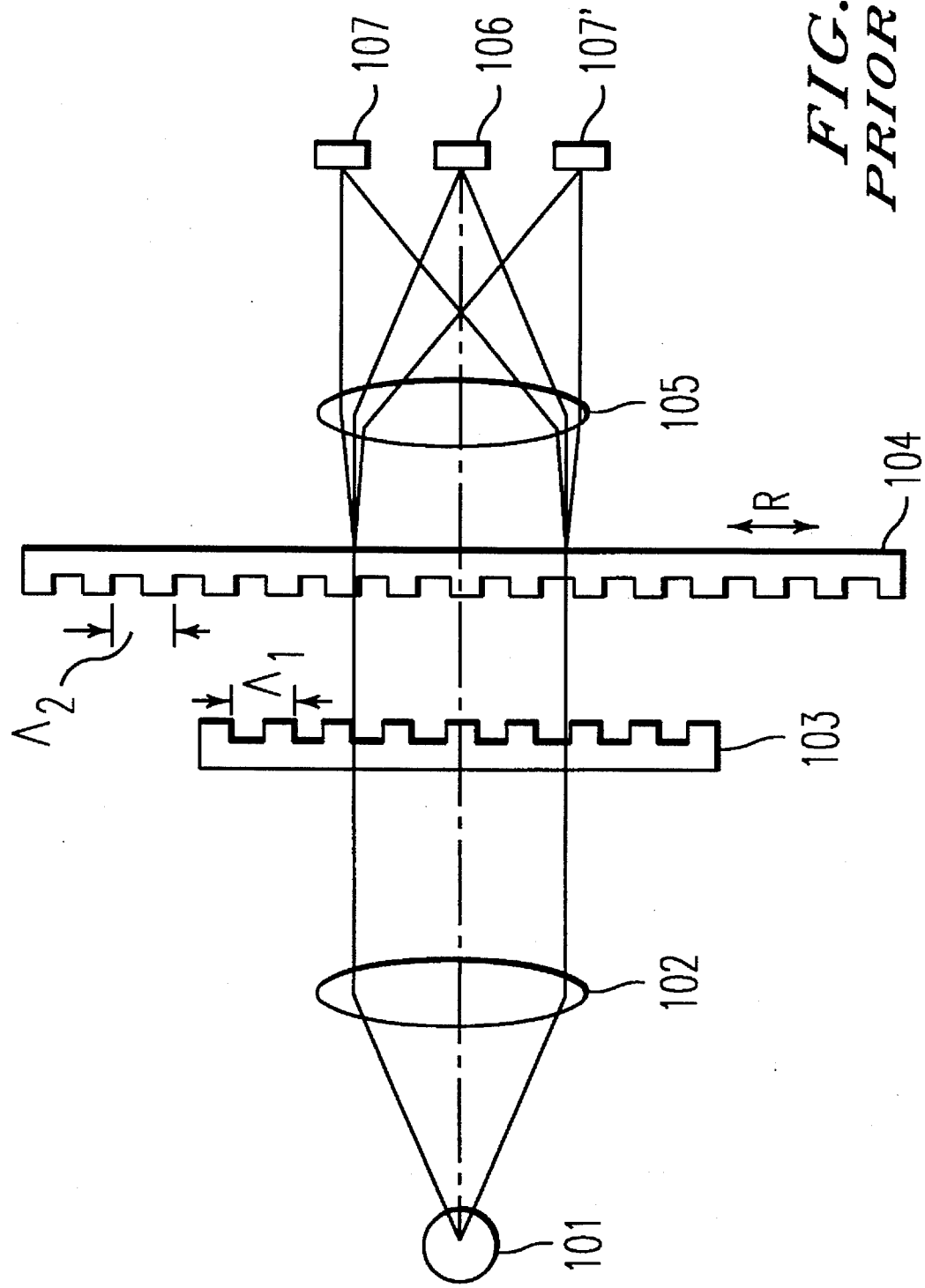
FIG. 23 is an illustration showing a structure of a conventional optical encoding apparatus.
Figure 24:
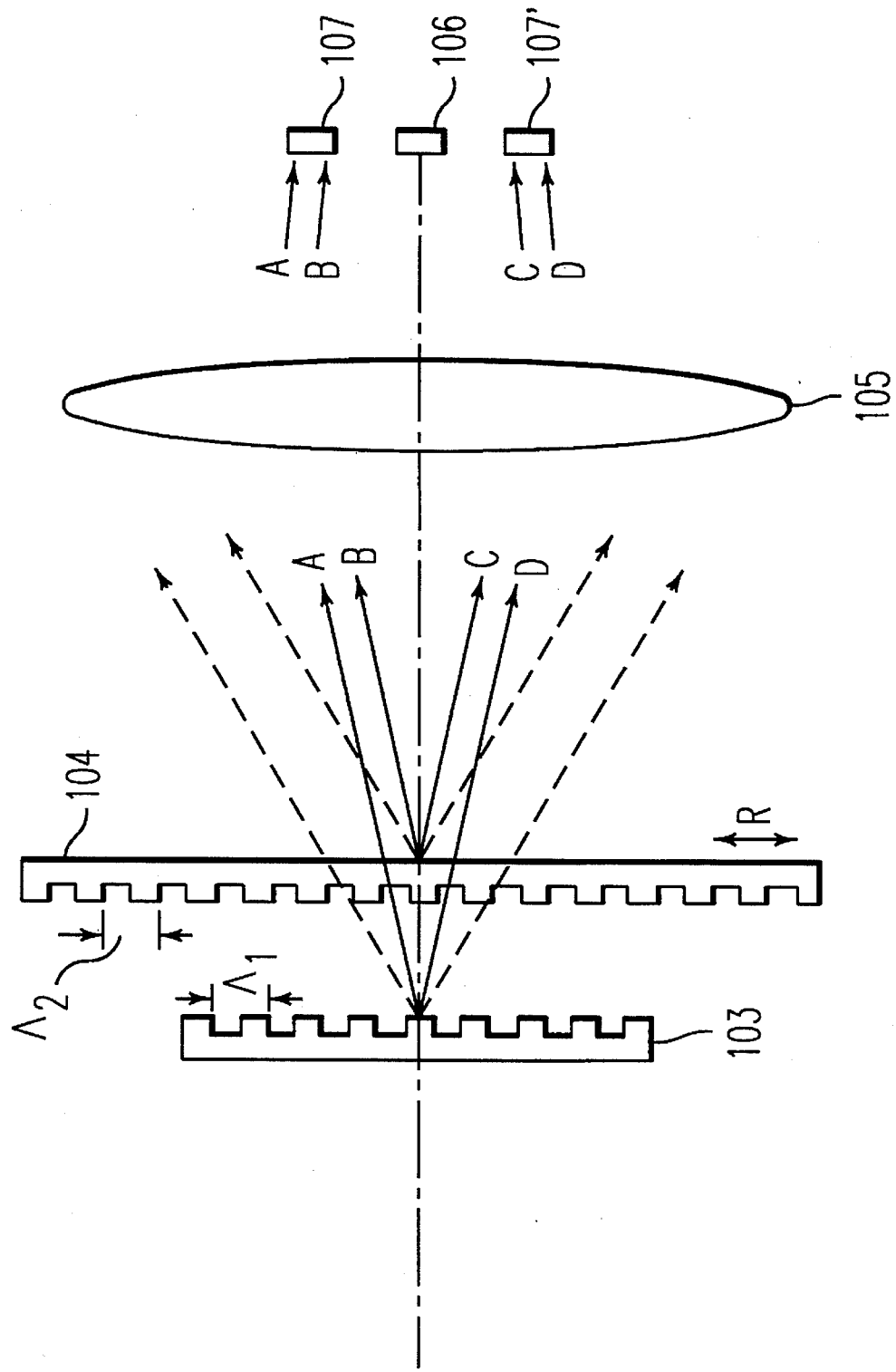
FIG. 24 is an illustration explaining diffraction beams generated by two gratings in the optical encoding apparatus shown in FIG. 23.
Figure 25:
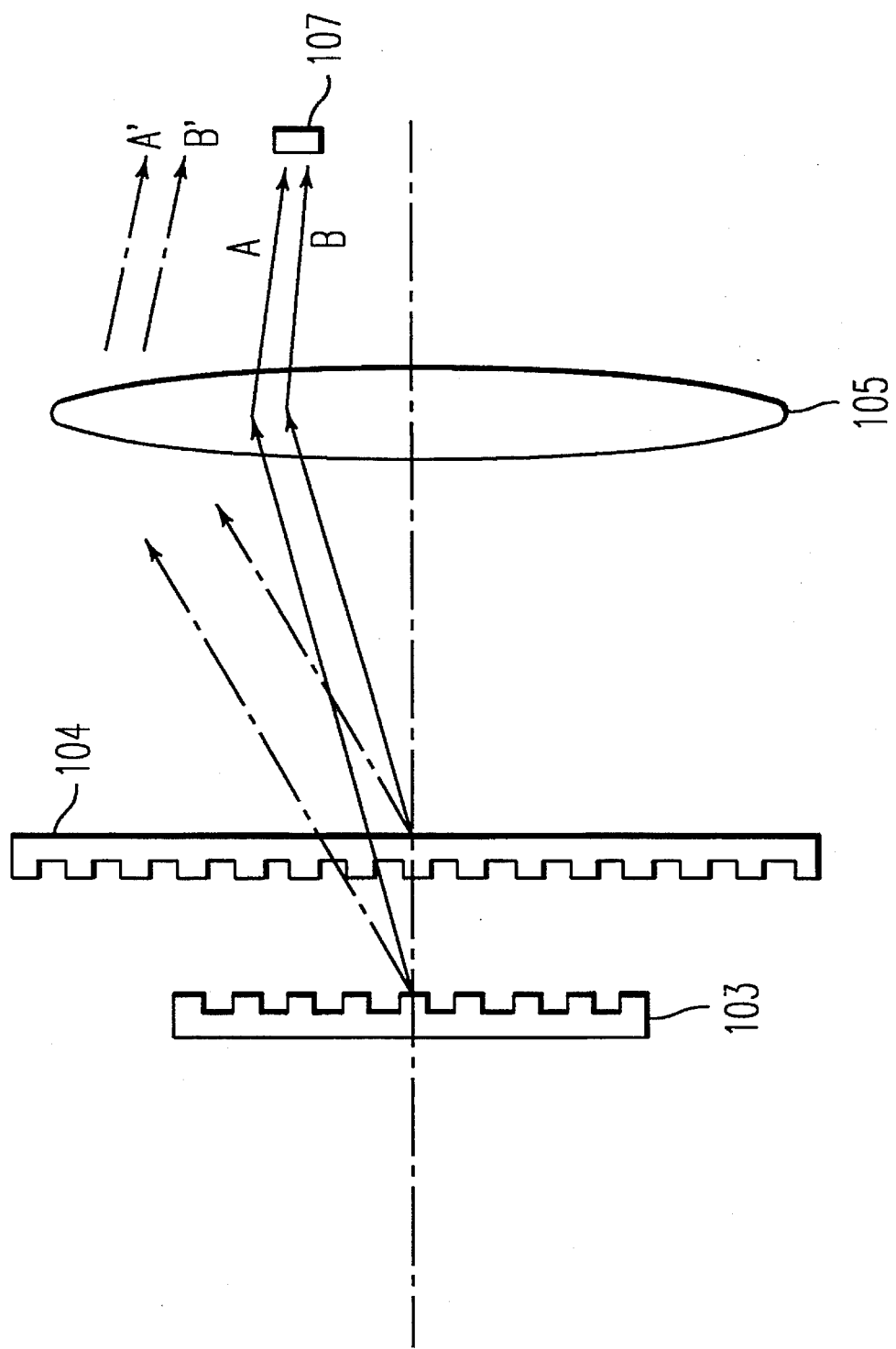
FIG. 25 is an illustration explaining diffraction beams generated by two gratings in the optical encoding apparatus shown in FIG. 23.

FIGS. 21 and 22 show examples of a rotary encoder using the principle of the optical encoding apparatus as shown in FIG. 19. The rotary encoder of FIG. 21 comprises the light source 1, the collimator lens 52 which collimates the light beam emitted by the light source 1, the cylindrical lens 31 which partially condenses the light beam which is transmitted through the collimator lens 52, the fixed diffraction grating 3, the movable diffraction grating 4 which is formed on a cylindrical surface, and the light receiving element 7. The movable diffraction grating 4 rotate about the axis X. In this embodiment, the cylindrical lens 31 condenses the light beam only in a direction of the circumference of the cylinder of the movable diffraction grating 4. Thus, it is not affected by unevenness of the grating pitch of the rotary encoder as shown in FIG. 16.

The rotary encoder of FIG. 22 comprises the light source 1, the collimator lens 52 which collimates the light beam emitted by the light source 1, the cylindrical lens 31 which partially condenses the light beam, the fixed diffraction grating 3, the movable diffraction grating 4 which is formed on a flat circular surface, and the light receiving element 7. The movable diffraction grating 4 is rotated about the axis X. In this embodiment, the cylindrical lens 31 condenses the light beam only in a direction of the circumference of the circle of the movable diffraction grating 4. Thus, it is not affected by unevenness of the grating pitch of the rotary encoder as shown in FIG. 17.

The displacement (movement) information obtained by the light receiving element 7, including the amount of rotation and rotation speed, of the movable diffraction grating can be obtained with high accuracy. Further, all the structures described with respect to the linear encoder of FIG. 19 may be applied to the rotary encoders of FIGS. 21 and 22 with the same advantages mentioned previously. Furthermore, it is possible for these embodiments shown in FIGS. 21 and 22, namely, not only improve the accuracy of detection of displacement information, but also to improve the efficiency of detection, even if the grating surface is affected by noise.

Some modifications could be provided according to the above mentioned embodiment of this invention. For example, the first diffraction grating could be the movable diffraction grating and the second diffraction grating could be the fixed diffraction grating.

Another modification could be that each of the diffraction gratings are movable diffraction gratings, and the light receiving element is provided for detecting a relative amount of displacement of the diffraction gratings.

The present invention efficiently generates interference fringes by use of the diffraction gratings and does not suffer from influence of wavelength change of a light beam due to temperature change. Accordingly, this invention enables the attainment of displacement information of the object accurately with high resolution and stability. Therefore, it has wide adaptability to apply a precision measuring apparatus, a drum rotation controlling device and a scanner for a copy machine, or the like.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An optical encoding apparatus for measuring a displacement of an object, said apparatus comprising:
   a light source for emitting a light beam;
   a light beam condensing means for condensing said light beam emitted by said light source;
   a first diffraction grating to which light beams condensed by said light beam condensing means are directed;
   a second diffraction grating to which light beams exiting from said first diffraction grating are directed; and
   displacement information obtaining means for obtaining information regarding a displacement of one of said first and second diffraction gratings, said information being obtained in accordance with a twice-diffracted beam diffracted by both said first and second diffraction gratings and a twice-transmitted beam transmitted through both of said first and second diffraction gratings without diffraction.

2. An apparatus according to claim 1, wherein said light source comprises a semiconductor laser.

3. An apparatus according to claim 1, wherein said first diffraction grating has a pitch equal to that of said second diffraction grating, and said first diffraction grating and second diffraction grating are arranged parallel to one another.

4. An apparatus according to claim 1, wherein a pitch of said first diffraction grating is different from a pitch of said second diffraction grating.

5. An apparatus according to claim 1, wherein said displacement information obtaining means obtains said information in accordance with interference fringes formed by said twice-diffracted beam and said twice-transmitted beam.

6. An apparatus according to claim 1, wherein said light beam condensing means partially condenses said light beam with respect to a characteristic of said displacement information obtaining means.

7. An apparatus according to claim 1, wherein said light beam condensing means partially condenses said light beam with respect to characteristics of said first and second diffraction gratings.

* * * * *